US007022966B2

(12) United States Patent
Gonzo et al.

(10) Patent No.: US 7,022,966 B2
(45) Date of Patent: Apr. 4, 2006

(54) SYSTEM AND METHOD OF LIGHT SPOT POSITION AND COLOR DETECTION

(75) Inventors: Lorenzo Gonzo, Trento (IT); Andrea Simoni, Trento (IT); Massimo Gottardi, Trento (IT); J. Angelo Beraldin, Ottawa (CA)

(73) Assignees: National Research Council of Canada, Ontario (CA); Istituto Trentino Di Cultura, Rento (IT)

( * ) Notice: Subject to any disclaimer, the term of this patent is extended or adjusted under 35 U.S.C. 154(b) by 627 days.

(21) Appl. No.: 10/207,855

(22) Filed: Jul. 31, 2002

(65) Prior Publication Data
US 2003/0025068 A1    Feb. 6, 2003

Related U.S. Application Data

(60) Provisional application No. 60/308,814, filed on Aug. 1, 2001.

(51) Int. Cl.
G01J 1/42    (2006.01)
(52) U.S. Cl. .............................. 250/208.2; 250/206.1; 250/226; 356/3.06
(58) Field of Classification Search ............ 250/208.2, 250/203.2–203.4, 208.6, 226, 202, 201.6, 250/208.1, 559.05; 356/3.01–3.08; 327/514, 327/515
See application file for complete search history.

(56) References Cited

U.S. PATENT DOCUMENTS

| | | |
|---|---|---|
| 3,209,201 A | 9/1965 | Anger |
| 4,593,967 A | 6/1986 | Haugen |
| 4,634,879 A | 1/1987 | Penney |
| 4,658,368 A | 4/1987 | Blais |
| 4,819,197 A | 4/1989 | Blais |

(Continued)

FOREIGN PATENT DOCUMENTS

DE    37 09 614 A1    10/1988

(Continued)

OTHER PUBLICATIONS

L. Gonzo, A. Simoni, M. Gottardi, D. Stoppa and J.A. Beraldin, "Smart Sensors for 3D Digitization," Proceedings of the 18th IEEE Instrumentation and Measurement Technology Conference, 2001; IMTC 2001, v.1, 2001, 117-122, NRC 44156.

(Continued)

Primary Examiner—David Porta
Assistant Examiner—Stephen Yam
(74) Attorney, Agent, or Firm—Oblon, Spivak, McClelland, Maier & Neustadt, P.C.

(57) ABSTRACT

A position and color detection sensor (for detecting a position of a light spot in a light distribution that can include stray light components, e.g. from other lasers, ambient lighting etc.) includes two discrete response position sensitive detectors (DRPSDs). The first DRPSD is used to calculate a raw estimate of the spot position and the second DRPSD is used to calculate the actual spot position based on information from the first DRPSD. Color is supported by further dividing each pixel of the first DRPSD into elementary photocells, each one covered with an appropriate optical filter. The use of two DRPSDs differing in pixel geometries makes them suitable for integration on the same chip using the same process. This reduces production and alignment costs. Further, analogue microelectronic processes can be used for color filter deposition and simple optics can be used for beam splitting and shaping.

12 Claims, 5 Drawing Sheets

U.S. PATENT DOCUMENTS

| | | | |
|---|---|---|---|
| 4,828,384 | A | 5/1989 | Plankenhorn et al. |
| 4,950,878 | A | 8/1990 | Ulich et al. |
| 5,177,556 | A | 1/1993 | Rioux |
| 5,198,877 | A | 3/1993 | Schulz |
| 5,235,656 | A * | 8/1993 | Hilgeman .................. 382/100 |
| 5,313,542 | A | 5/1994 | Castonguay |
| 5,353,073 | A | 10/1994 | Kobayashi |
| 5,424,835 | A | 6/1995 | Cosnard et al. |
| 5,430,472 | A | 7/1995 | Curry |
| 5,513,276 | A | 4/1996 | Theodoracatos |
| 5,640,246 | A | 6/1997 | Castonguay |
| 6,297,488 | B1 | 10/2001 | Beraldin et al. |
| 6,593,559 | B1 * | 7/2003 | Yamakawa ............... 250/208.1 |
| 6,894,812 | B1 * | 5/2005 | Spears ........................ 358/483 |

FOREIGN PATENT DOCUMENTS

| WO | WO 00/66984 | 11/2000 |
|---|---|---|

OTHER PUBLICATIONS

J.A. Beraldin, F. Blais, M. Rioux, J. Dorney (National Research Council of Canada), L. Gonzo, A. Simoni, M. Gottardi and D. Stoppa, "VLSI Laser Spot Sensors for 3D Digitzation," (ITC-IRST, Italy) ODIMAP III 3$^{rd}$ Topical Meeting on Optoelectronic Distance/Displacement Measures and Applications, Sep. 20-22, 2001, Pavia, Italy, NRC 44884.

L. Gonzo, A. Simoni, M. Gottardi, D. Maschera and J.A. Beraldin, "Smart VLSI Opto-Sensors Developments at the Istituto per la Ricerca Scientifica e Tecnologica," Proceedings of the Canada-Italy Workshop: Heritage Applications of 3D Digital Imaging, Ottawa, ON, Oct. 1, 1999, NRC 43646.

L. Gonzo, M. Gottardi, A. Simoni and J.A. Beraldin, "A Novel Optical Bi-Cell With Integrated Readout Circuitry," Proceedings of the 1999 IEEE International Symposium on Circuit and Systems, Orlando, FL, May 30-Jun. 2, 1999, May 30, 1999, NRC 41640.

L. Gonzo, M. A. Simoni, M. Gottardi, D. Stoppa and J.A. Beraldin, "Integrated Optical Sensor for 3D Vision Systems," Proc. Progetto Finalizzato MADESS II, Microelettronica e Beni Culturali, Apr. 19, 2001, Florence, Italy.

A. Simoni, L. Gonzo and M. Gottardi, "Integrated Optical Sensors for 3 D Vision," Proc. SENSORS 2002, Jun. 11-14, 2002, Orlando, FL.

L. Gonzo, M. Gottardi, F. Comper and A. Simoni, J.A. Beraldin, F. Blais, M. Rioux and J. Dorney, "Smart Sensors for 3D Digitization," Proc. Italy-Canada Workshop on 3D Digital Imaging and Modeling Conference, Apr. 3-4, 2001, Padua, Italy.

F. Blais and M. Rioux, "Real-Time Numerical Peak Detector," Signal Process, 11 (2), Jan. 1986, pp. 145-155.

A. Makynen et al. High Accuracy CMOS Position Sensitive Photodetector (PSD),) Electronics Letters, vol. 33, No. 2, Jan. 1997, pp 128-130.

A. Makynen and J. Kostamovaara, "Linear and Sensitive CMOS Position-Sensitive Photodetector," Electronics Letters, vol. 34 (12), Jun. 1998, pp 1255-1256.

Heimann, Heimann GmbH, "Large Area Sensor Technology-LAE," Weher Koppel 6, D-6200, Wiesbaden, West Germany.

A. Makynen et al., "A Binary Photodetector Array for Position Sensing," Sensors and Actuators A, CH, Elsevier Sequoia S.A., Lausanne, vol. 65, No. 1, Feb. 1998, pp. 45-53.

* cited by examiner

SYSTEM AND METHOD OF LIGHT SPOT POSITION AND COLOR DETECTION

CROSS-REFERENCE TO RELATED APPLICATION

Benefit and priority is claimed from U.S. provisional patent application Ser. No. 60/308,814 filed Aug. 1, 2001, which is currently pending and is hereby incorporated by reference into this application.

FIELD OF THE INVENTION

This invention relates to the field of light spot position and colour detection systems and methods in, for example, robotic and vision applications.

BACKGROUND OF THE INVENTION

The optical measurement of light spot position and colour detection is used in many robotic control and vision systems. Range cameras, used for three-dimensional (3D) imaging, exploit geometric arrangements (such as active optical triangulation), properties of light propagation, and light interference to extract distance shape. Optical triangulation relies on the measurement of the position of a focused light beam impinging on a linear or bi-dimensional sensor. Active triangulation is based on the sine law: knowledge of two angles of a triangle and one side (baseline) fully determines its dimensions.

The principle of active triangulation is illustrated in a system 10 shown in FIG. 1. The system 10 includes a lens 12 for receiving light beams 14a,b (termed collected beams) generated from a projected beam 16. An optical position sensor 18 receives the light beams 14a,b after passing through the lens 12 emanating from the intersection of the projected beam 16 with a reflective surface at 19a and 19b.

As described above, the knowledge of two angles and one side of a triangle fully determines its dimensions. The two known angles in system 10 are $\alpha_1$ and $\alpha_2$ of a triangle 20 bounded by the projected beam 16, the collected beam 14a and a baseline 22. The angles ($\alpha_1$, $\alpha_2$) are of the projected beam 16 and the collected beam 14a relative to the baseline 22, respectively. The angle $\alpha_2$ of the collected beam 14a is measured using the lens 12 and the optical position sensor 18 that measures a length L as the distance between the collected beams 14a,b on the sensor 18. The length L is related to the angle $\alpha_2$ and therefore a displacement Z based on the sine law as discussed above.

Many devices have been considered in the past for measuring the position and/or colour of the collected light beam. The devices generally belong to one of two main groups: continuous response position sensitive detectors (CRPSD) and discrete response position sensitive detectors (DRPSD).

A CRPSD is defined as a class of position sensitive detectors that determine/calculate the centroid of a light distribution, which may include stray light components in addition to a desired light spot. A DRPSD is defined as a class of position sensitive detectors that sample and analyse the entire light distribution to determine the position of the desired light spot within the light distribution.

CRPSD are generally based on lateral effect photodiodes and geometrically shaped photo-diodes (wedges or segmented) such as disclosed in A. Makynen and J. Kostamovaara, *Linear and sensitive CMOS position sensitive photodetector*, Electronics Letters, Vol. 34 (12), pp. 1255–1256, June 1998 and in A. Makynen et al., *High accuracy CMOS position sensitive photodetector (PSD)*, Electronics Letters, Vol. 33 (21), pp. 128–130, January 1997 both of which are incorporated herein by reference.

DRPSD are generally implemented using an array of photosensors where they are read out serially by metal oxide semiconductor field effect transistor (MOSFET) switches or a charge coupled device (CCD) such as disclosed in F. Blais and M. Rioux, *Real-Time Numerical Peak Detector*, Signal Process., 11(2), 145–155 (1986) incorporated herein by reference.

CRPSD are known to measure the centroid of a light distribution impinging on its resistive surface to a very high level of resolution and speed. However, accuracy is reduced when spurious light is present together with the main light distribution. DRPSD can achieve, with a peak detection algorithm, higher accuracy levels since the distribution is sampled and hence available for processing but at a slower speed relative to a CRPSD.

The use of a combination of a DRPSD and one or more CRPSD(s) for position and colour detection has been proposed in Applicant's U.S. Pat. No. 6,297,488 issued Oct. 2, 2001 titled "Position Sensitive Light Spot Detector", incorporated herein by reference. In the systems proposed in U.S. Pat. No. '488, CRPSD(s) is/are used to calculate a rough estimate of the light distribution centroid position and the DRPSD is used to finely calculate the actual spot position.

SUMMARY OF THE INVENTION

In accordance with one aspect of the present invention there is provided a system for detecting a position of a light spot in a light distribution comprising: (a) a first discrete response position sensitive detector (DRPSD) of length $L_1$ having a first prescribed number of photo-sensitive pixels for determining an estimate of the light spot position; and (b) a second discrete response position sensitive detector (DRPSD) of length $L_2$ having a second prescribed number of photo-sensitive pixels operating within a window of prescribed width approximately centered about the estimate of the light spot position determined by the first discrete response position sensitive detector, the length $L_1$ being substantially equal to the length $L_2$.

In an exemplary feature of the present invention, the first prescribed number of photo-sensitive pixels of the first DRPSD is equal to $2^n$, each being of a first prescribed pixel size; the second prescribed number of photo-sensitive pixels of the second DRPSD is equal to $2^k$, each being of a second prescribed pixel size, where $n \leq k$ and the first prescribed pixel size being larger than the second prescribed pixel size.

In a further exemplary feature of the present invention the window of prescribed width is defined as a sum of the widths of $2^m$ pixels, where m<k.

In accordance with another aspect of the present invention there is provided a method of detecting a position of a light spot in a light distribution comprising: (a) determining an estimate of the light spot position using a first discrete response position sensitive detector (DRPSD) having a plurality of photo-sensitive pixels; (b) defining a window of prescribed width approximately centered about the estimate of the light spot position; and (c) determining the position of the light spot using a second discrete response position sensitive detector (DRPSD) having a plurality of photo-sensitive pixels based on the window.

BRIEF DESCRIPTION OF THE DRAWINGS

The present invention will be described in conjunction with the drawings in which.

DETAILED DESCRIPTION OF EMBODIMENTS OF THE INVENTION

By way of background, continuous response position sensitive detectors (CRPSD) provide the centroid of a light distribution with a fast response time. Examples of well known CRPSDs include: (a) lateral effect photo-diode; (b) transparent type lateral effect photodiodes (2D case); (c) segmented CRPSD with a non-linear transfer curve; (d) bi-cell and quad sensors; (e) wedge based (f) linear or non-linear density filter; (g) masked coded in gray scale or binary scale; and (h) direct implementation of median with analog saturated amplifiers.

Further, discrete response position sensitive detectors (DRPSD) are generally slower than CRPSDs because all the photodetectors have to be read sequentially prior to the measurement of the location of the real peak of the light distribution. Examples of well known DRPSDs include: (a) linear array; (b) bi-linear array; (c) time-delay integration; (d) frame transfer; (e) full frame with shutter; (f) frame transfer; (g) interline; (h) reading and multiplexing structure of arrays; and (i) programmable slit position on discrete array.

Figure 1:
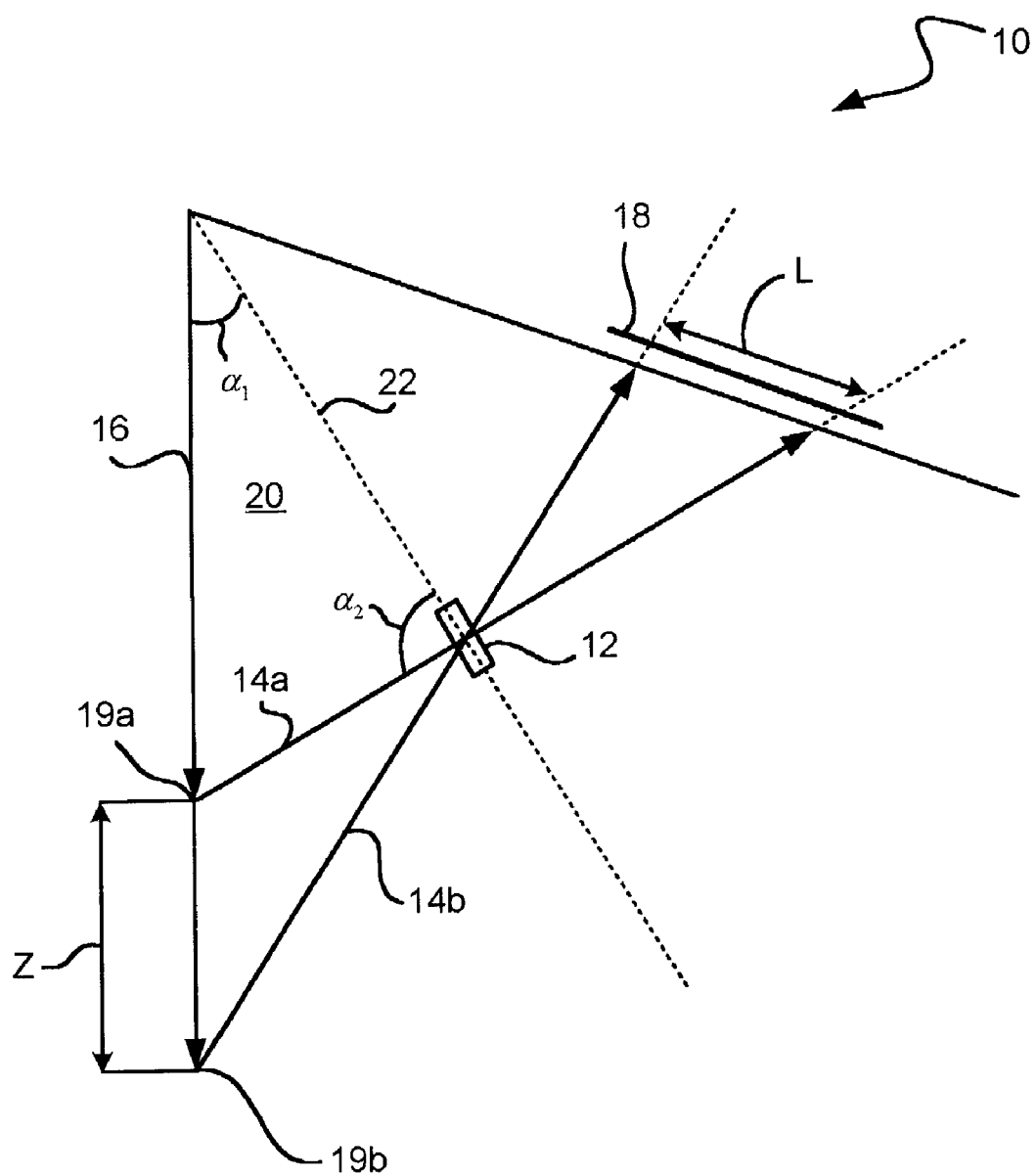
FIG. 1 is a schematic representation illustrating the concept of optical triangulation.
Figure 2:
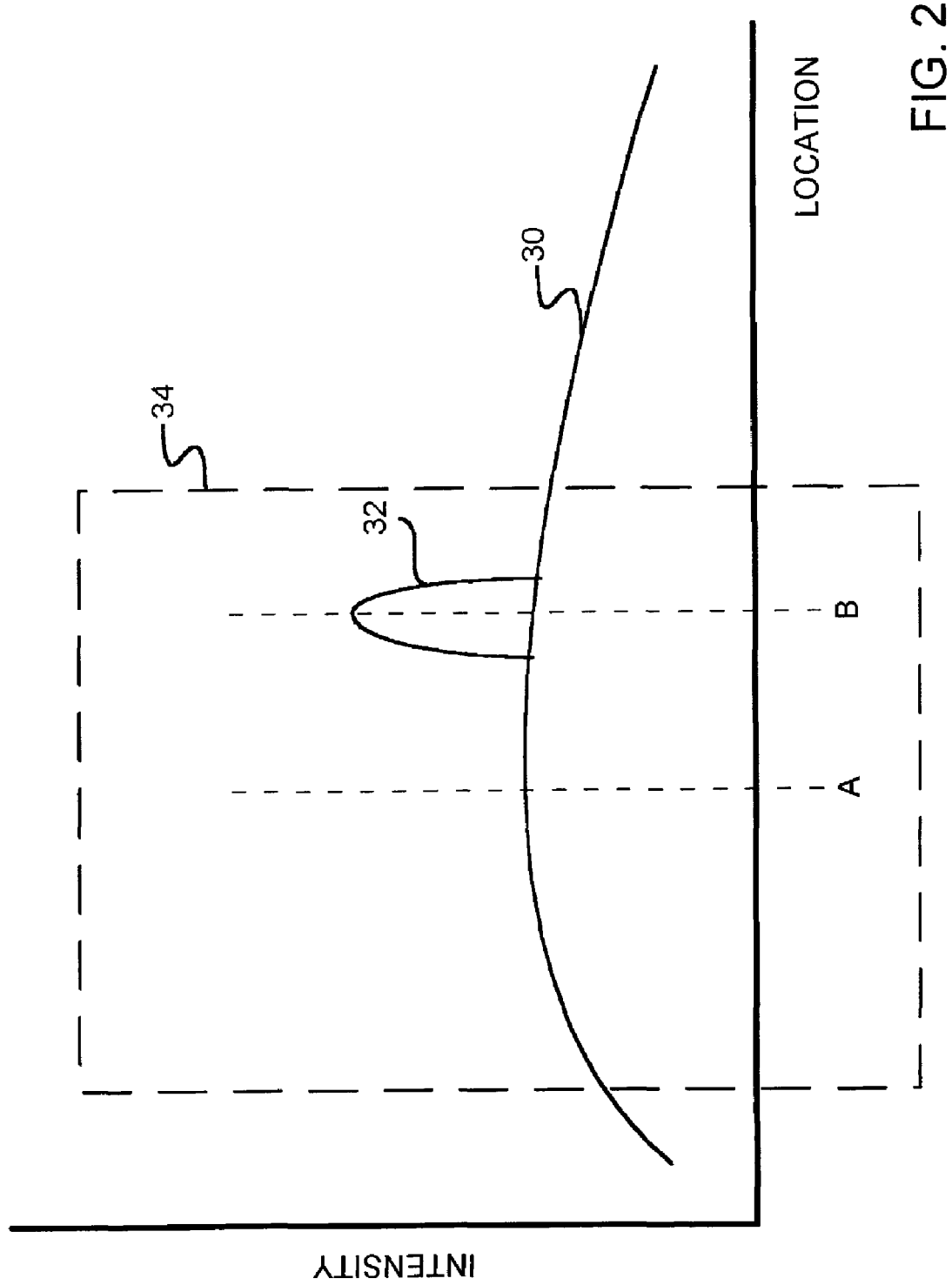
FIG. 2 illustrates a typically light distribution to illustrate the operation of the system and method of the present invention.

FIG. 2 illustrates a schematic representation of a typical light profile collected on the light spot position sensor 18 plotted as intensity versus location. Two profiles are shown for illustration purposes: a background profile 30 that includes background and stray light and a desired light spot 32. This example shows a typical situation where stray light that contributes to the profile 30 blurs the measurement of the real, much narrower, light spot 32. FIG. 2 is only illustrative for simplicity and can be extended to multiple spots or lines.

In general, the present invention provides a system and method that obtains a raw estimate (point A) of the desired light spot 32 using a first configured DRPSD then uses a second configured DRPSD, within a reading/sub window 34 of the total light distribution containing the raw estimate A, to obtain a final solution (point B).

Figure 3:
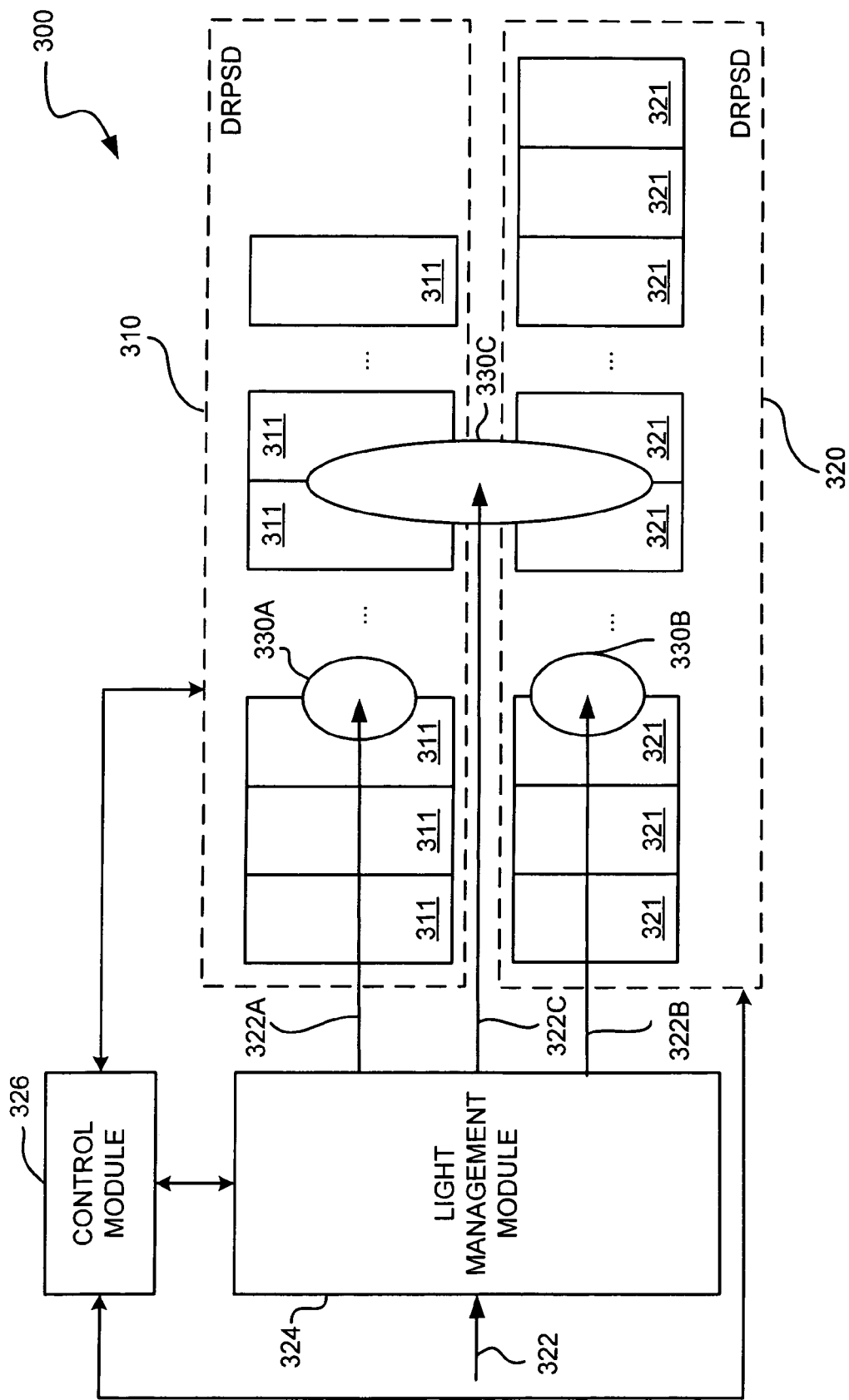
FIG. 3 is a block diagram representation of a light position detection system according to the an embodiment of the present invention.

A block diagram representation of a light position detection system 300 according to an embodiment of the present invention is shown in FIG. 3. The system 300 includes two DRPSDs 310 and 320 each one functioning in a storage mode, which means that impinging light is converted to charges and accumulated on individual photo sensitive pixels (described in detail below).

The two DRPSDs 310 and 320 process a light distribution simultaneously with the DRPSD 310 having $2^n$ photo-sensitive pixels 311 and the DRPSD 320 having $2^k$ photo-sensitive pixels 321, where $n \leq k$. The pixels 311 and 321 can be arranged in individual arrays where preferably each array has the same physical length.

In particular, an incoming light beam 322 can be either split into two components 322A and 322B, each directed on one DRPSD (i.e., beam 322A directed to DRPSD 310 to form a spot 330A and beam 322B directed to DRPSD 320 to form a spot 330B), or can be shaped to produce a beam 322C for striking both DRPSDs 310, 320 simultaneously at a spot 330C. A light management module 324 is used to direct the incoming light beam 322 using beam splitters, diffracting or defocusing elements, which perform the necessary manipulation of the incoming light beam 322 as known in the art. A control module 326 controls the functions of the light management module 324 and the two DRPSDs 310 and 320.

As indicated above, the DRPSDs 310 and 320 are designed to have $2^n$ and $2^k$ pixels, respectively, where $n \leq k$ and e.g., n=5 and k=8. The DRPSD 310 (with $2^n$ pixels 311) is used to calculate a raw estimate (point A in FIG. 2) of the spot 330A from light beam 322A or of the spot 330C from light beam 322C depending on how the incoming light beam 322 is managed as discussed above. The DRPSD 320 (with $2^k$ pixels 321) is used to calculate the light spot position (point B in FIG. 2) of the spot 330B from light beam 322B or of the spot 330C from light beam 322C with higher accuracy on the basis of information (i.e., the raw estimate) provided by the DRPSD 310.

More specifically, the DRPSD 310 sends to the controller 326 the raw estimate (point A in FIG. 2) of the spot position 330A that is used to determine characteristics (i.e., width, start pixel) of the window 34 (see FIG. 2) that is read out of the DRPSD 320. The DRPSD 310 has larger pixels than the DRPSD 320 and therefore needs a lower integration time for producing a manageable signal. The fact that a pixel is larger implies that a physically larger photo-sensitive area can be used to collect light. Therefore, the DRPSD 310 reaches a given signal level faster than what is possible by the DRPSD 320. Consequently, impinging light does not have to be integrated for a long time in order to reach a manageable level.

The size and boundaries of the window 34 are implementation specific (further examples are described below) and is generally centered about the raw estimate (point A) determined by the DRPSD 310. In general, the width of the window 34 is the sum of the widths of $2^m$ pixels, with the index m being prescribed by the application and where preferably m<k.

In general, a photo-generated signal (PGS) is defined as information (i.e., a signal) created by converting light striking the pixels of a DRPSD into electrical charges that are stored in packets in the pixel. The packet of charges can be retrieved at a later time. Typically this time corresponds to a read cycle of a given detection system. For example, FIG. 3 shows two ways for the impinging light to reach the surface of the two sensors (i.e., from beam 322A for DRPSD 310 (spot 330A) and from beam 322B for DPRSD 320 (spot 330B) or from the single beam 322C for both DRPSD 310 and 320 (spot 330C)).

Figure 4:
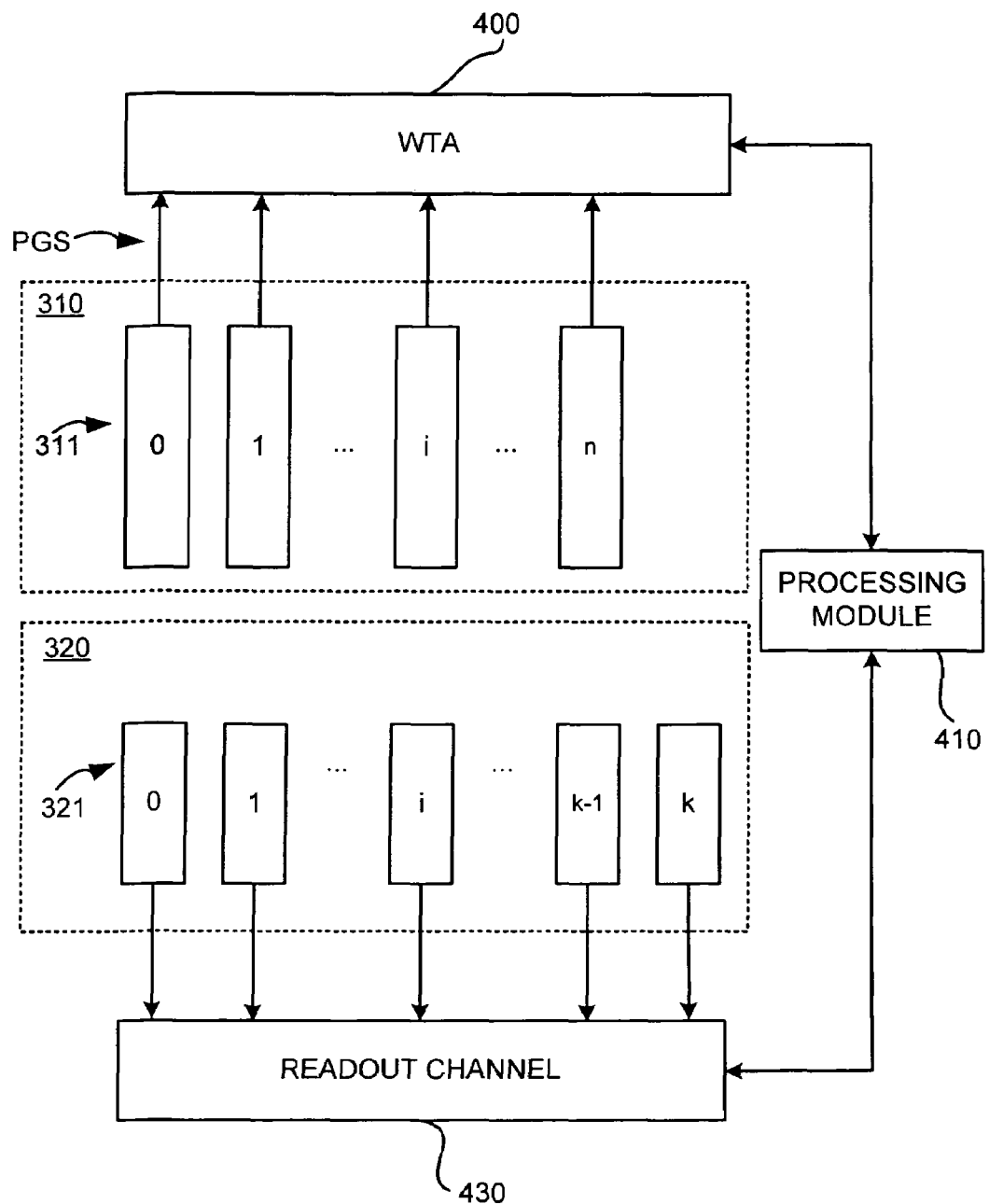
FIG. 4 is an expanded block diagram representation of the system of FIG. 3.

An expanded representation of the DRPSDs 310 and 320 and additional components of the system 300 are illustrated in FIG. 4. Photo-generated signals (PGS) from each photo-sensitive pixel 311 of the DRPSD 310 are processed to determine the pixel that has produced the larger photo-signal (also termed the winner). The processing of the PGSs may be made by a winner-take-all circuit (WTA) 400 or, alternatively, by some other decision process for determining the winner.

The PGSs from the DRPSD 310 can be processed as follows:
(a) the photo-generated signal on pixel i of DRPSD 310 is compared with that on pixel i+1 where i is an index that runs from 1 to n−1;
(b) the result of the WTA 400 (or other decision processes) is provided to a processing module 410, which includes standard combinatorial logic circuits, readout modules and the like known in the art, to generate the value of i relative to the pixel with the highest photo-generated signal (i.e., the raw spot position A—see FIG. 2); and
(c) this information is further processed by the processing module 410, which calculates an address of the window 34 (see FIG. 2) of for example $2^m$ pixels (m<k), on the DRPSD 320, substantially centered on the raw spot position A given by the DRPSD 310.

If the spot 330A, 322A on the DRPSD 310, 320 lies between two pixels then the result of (b) will be two pixels having the highest photo-generated signal (i.e., two winners). This situation is handled by the control module 326.

As described above, the DRPSD 320 has a higher pixel resolution and is therefore suited for accurate spot position detection. Only the pixels addressed by the sub-window 34 are read out by a readout channel 430 thereby greatly increasing the read out speed to generate the desired spot position B.

In the embodiment where the incoming beam 322 is split into two beams 322A and 322B, the system 300 can compensate by doubling the laser power of a source (not shown) generating the beam 322. Well known algorithms for peak extraction are can then be applied to the light distribution of interest.

Figure 5:
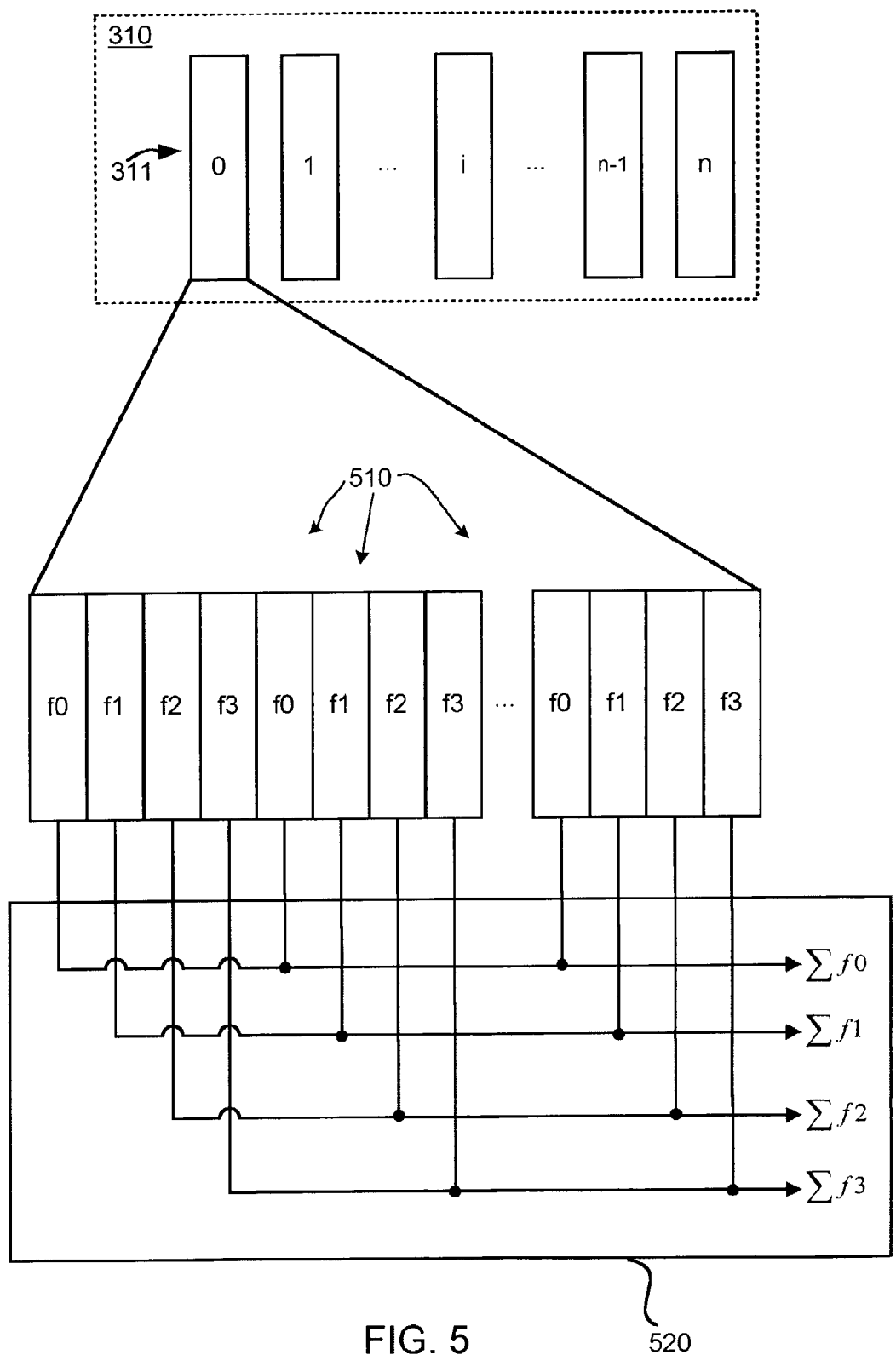
FIG. 5 is block diagram representations of the system of FIG. 3 with modifications in pixel geometry of one of the DRPSD's to support spot and colour detection according to an embodiment of the present invention.

Modifications to the DRPSD 310 of the system 300 shown in FIG. 3 are made to support colour detection, as shown in FIG. 5. In particular, each pixel 311 of the DRPSD 310 is further divided into a plurality of elementary photocells 510; a select subset of the photocells 510 being covered with an appropriate optical filter (e.g. designated f1-red, f2-green, and f3-blue). Uncovered elementary photocells 510 (one per pixel, designated f0-no filter) are preserved for the raw spot position detection described above. The number of elementary photocells 510 is correlated to the photolithography of the filters known in the art. The filters used are examples only and other applications may use different colors and different combinations of colors.

The elementary photocells 510, within the same pixel i, carrying the same filter as well as the uncovered photocells are parallel connected to a readout channel 520 as shown in FIG. 5 (see lines associated to each group of photocells 510 for each individual filter f0, f1, f2, f3), which provides both raw spot position (from the Σf0 cells) and colour intensity information (from the Σf1, Σf2 and Σf3 cells). Only a subset of the pixels of the DRPSD 310 for the various photocells 510 need be summed to obtain measurements and is dependent on application and accuracy requirements.

The geometry of the elementary photocells 510 can be rectangular, as shown in FIG. 5, square, etc., provided roughly a predetermined ratio between the number of elementary photocells for each colour (RGB) and for the uncovered cells as a function of illuminated sensitive area is maintained (e.g. the ratio of the exposed sensitive area is controlled).

In summary, the present invention as described provides a position and colour (in an exemplary embodiment) detection sensor (for detecting a position of a light spot in a light distribution that can include stray light components, e.g. from other lasers, ambient lighting etc.) that includes two discrete response position sensitive detectors (DRPSDs). The first DRPSD is used to calculate a raw estimate of the spot position and the second DRPSD is used to calculate the actual spot position based on information from the first DRPSD. Colour is supported by further dividing each pixel of the first DRPSD into elementary photocells, each one covered with an appropriate optical filter (e.g., one or more of red, green, blue and no filter). The use of two DRPSDs differing in pixel geometries makes them suitable for integration on the same chip using the same process. This reduces production and alignment costs. Further, analogue microelectronic processes can be used for colour filter deposition and simple optics can be used for beam splitting and shaping as is well known in the art.

What is claimed is:

1. A system for detecting a position of a light spot in a light distribution comprising:
a first discrete response position sensitive detector (DRPSD) of length $L_1$ having a first prescribed number of photo-sensitive pixels for determining an estimate of the light spot position;
a second discrete response position sensitive detector (DRPSD) of length $L_2$ having a second prescribed number of photo-sensitive pixels operating within a window of prescribed width approximately centered about the estimate of the light spot position determined by the first discrete response position sensitive detector, the length $L_1$ being substantially equal to the length $L_2$;
means for receiving a photo-generated signal from each of the photo-sensitive pixels from the first DRPSD; and
means for comparing the received photo-generated signals to determine which one of the photo-sensitive pixels from the first DRPSD has the highest photo-generated signal, the highest photo-generated signal being representative of the estimate of the light spot position; wherein the first prescribed number of photo-sensitive pixels of the first DRPSD is equal to $2^n$, each being of a first prescribed pixel size; the second prescribed number of photo-sensitive pixels of the second DRPSD is equal to $2^k$, each being of a second prescribed pixel size, where $n \leq k$ and the first prescribed pixel size being larger than the second prescribed pixel size.

2. The system of claim 1, wherein the window of prescribed width is defined as a sum of the widths of $2^m$ pixels, where m<k.

3. The system of claim 1, further comprising a light management module for conditioning an incoming light beam to produce a first beam and a second beam with the first beam striking the first DRPSD and the second beam striking the second DRPSD.

4. The system of claim 1, further comprising a light management module for conditioning an incoming light beam to strike both the first DRPSD and the second DRPSD substantially simultaneously.

5. The system of claim 1, wherein each one of the photo-sensitive pixels of the first DRPSD is further divided into elementary photocells with a subset of the elementary photocells being optically managed by colour filters and an uncovered elementary photocell.

6. The system of claim 5, wherein the colour filter is selected from the group consisting of a red filter, a green filter and a blue filter.

7. The system of claim 6, further comprising a readout channel for generating output representative of: (i) the sum of each of the color filters of the subset of elementary photocells of a predetermined number of the photo-sensitive pixels of the first DRPSD; and (ii) the sum of the uncovered elementary photocells of a predetermined number of the photo-sensitive pixels of the first DRPSD, wherein output (ii) represents the light spot position and output (i) represents colour information associated with the light spot.

8. A method of detecting a position of a light spot in a light distribution comprising:
  determining an estimate of the light spot position using a first discrete response position sensitive detector (DRPSD) having a plurality of photo-sensitive pixels;
  defining a window of prescribed width approximately centered about the estimate of the light spot position;
  determining the position of the light spot using a second discrete response position sensitive detector (DRPSD) having a plurality of photo-sensitive pixels based on the window;
  receiving a photo-generated signal from each of the photo-sensitive pixels from the first DRPSD; and
  comparing the received photo-generated signals to determine which one of the photo-sensitive pixels from the first DRPSD has the highest photo-generated signal, the highest photo-generated signal being representative of the estimate of the light spot position.

9. The method of claim 8, further comprising conditioning an incoming light beam to produce a first beam and a second beam with the first beam striking the first DRPSD and the second beam striking the second DRPSD.

10. The method of claim 8, further comprising conditioning an incoming light beam to strike both the first DRPSD and the second DRPSD substantially simultaneously.

11. The method of claim 8, further comprising optically managing a subset of a plurality of elementary photocells for each one of the photo-sensitive pixels of the first DRPSD by a set of colour filters and an uncovered elementary photocell.

12. The method of claim 11, generating a set of outputs from the plurality of elementary photocells of a predetermined number of the photosensitive pixels of the first DRPSD, the set of outputs being representative of: (i) the sum of output generated by the elementary photocells for each of the colour filters in the set of colour filters; and (ii) the sum of output generated by the uncovered elementary photo cells, wherein output (ii) represents the light spot position and output (i) represents colour information associated with the light spot.

* * * * *

UNITED STATES PATENT AND TRADEMARK OFFICE
CERTIFICATE OF CORRECTION

PATENT NO. : 7,022,966 B2
APPLICATION NO. : 10/207855
DATED : April 4, 2006
INVENTOR(S) : Gonzo et al.

Page 1 of 1

It is certified that error appears in the above-identified patent and that said Letters Patent is hereby corrected as shown below:

<u>Title page,</u>
Item [73], should read:
-- [73] Assignee: National Research Council of Canada, Ontario (CA); Istituto Trentino Di Cultura, Trento (IT) --.

Signed and Sealed this

Twenty-seventh Day of June, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,022,966 B2 |
| APPLICATION NO. | : 10/207855 |
| DATED | : April 4, 2006 |
| INVENTOR(S) | : Gonzo et al. |

It is certified that error appears in the above-identified patent and that said Letters Patent is hereby corrected as shown below:

Title page Item [56]
On page two, under OTHER PUBLICATIONS, the fourth name author should read --J. Domey-- not "J. Dorney".

Signed and Sealed this

Twentieth Day of March, 2007

JON W. DUDAS
*Director of the United States Patent and Trademark Office*